March 12, 1957     R. C. DICKEY ET AL     2,784,695
APPARATUS FOR MAKING ABRASIVE COATED SHEET MATERIAL
Filed Oct. 27, 1954
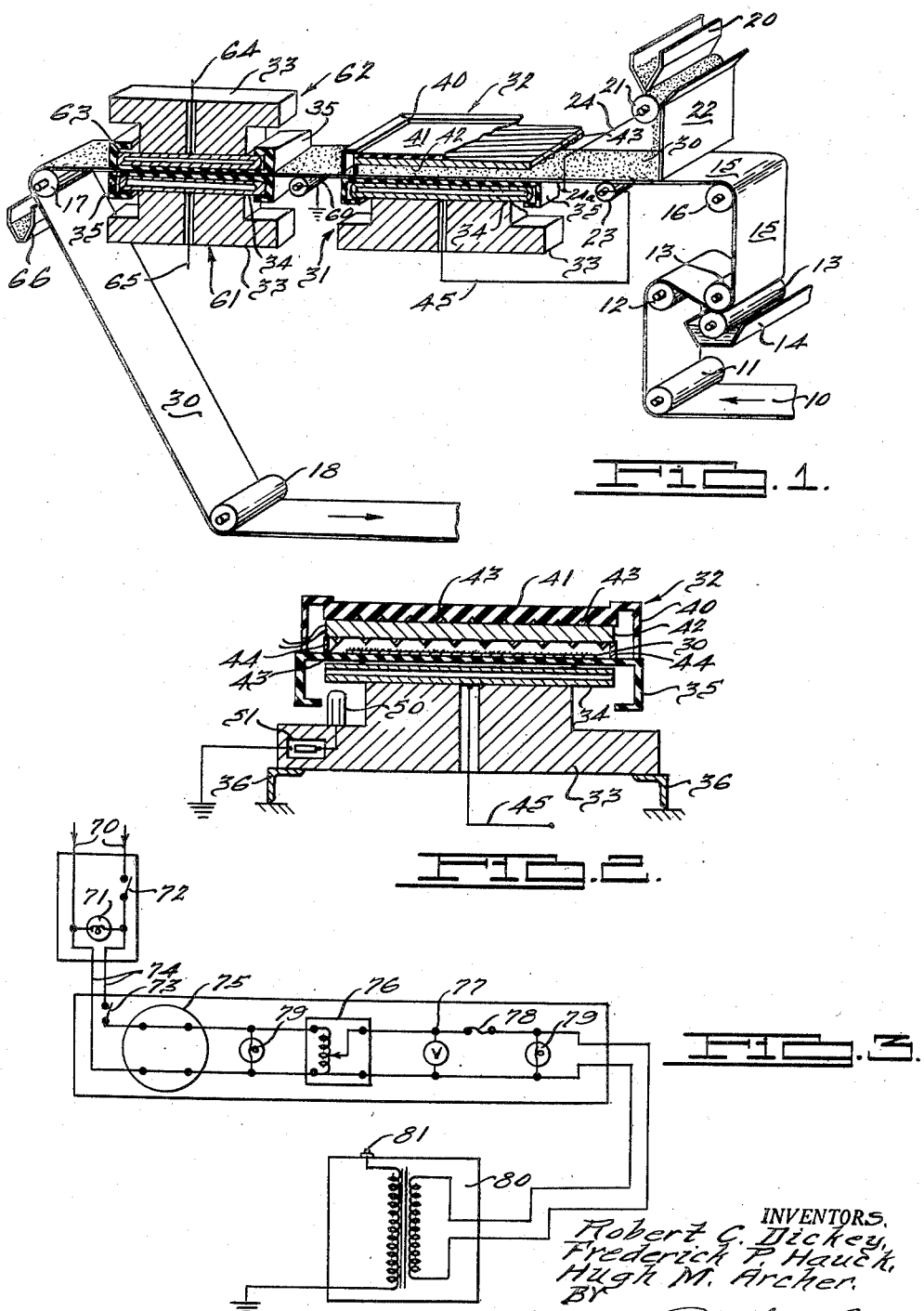
INVENTORS.
Robert C. Dickey,
Frederick P. Hauck,
Hugh M. Archer.
BY
Harness, Dickey & Pierce
ATTORNEYS.

United States Patent Office 2,784,695
Patented Mar. 12, 1957

2,784,695

APPARATUS FOR MAKING ABRASIVE COATED SHEET MATERIAL

Robert C. Dickey, Mount Clemens, Frederick P. Hauck, Detroit, and Hugh M. Archer, Dearborn, Mich., assignors to Michigan Abrasive Company, Detroit, Mich., a corporation of Michigan Application October 27, 1954, Serial No. 464,932

4 Claims. (Cl. 118—51)

The present invention relates to the production of sheet-like material having on at least one of its sides a coating of adhesively-bound particulate material. More specifically, this invention relates to the production of abrasive-coated sheet material such as sandpaper and the like.

In general, there are two general methods of producing sheet material coated with adhesively-bound granular abrasive or other type of finely-divided particulate matter. One method, which may be referred to as the gravimetric method, consists in depositing the finely-divided material by pouring, spreading, sprinkling, spraying, or other operation, wherein the finely-divided material falls under the influence of gravity onto the adhesive coating. The other is the propulsion method wherein air, mechanical or electrostatic means propel the finely-divided material (usually against the effect of gravity) into the adhesive coating. Both of these methods find wide use in the production of sheet-like abrasive materials such as sandpaper. The propulsion method has been found superior because it results in a more uniform deposition of the abrasive and in a greater percentage of aligned particles in the coating. The latter method, however, is more difficult to control and, moreover, is not entirely satisfactory with certain types and sizes of abrasive grains.

For the latter and other reasons, the major proportion of sandpaper-type abrasives have been made by gravimetric deposition methods. These methods, however, have not resulted in as uniform or as high a quality product as has been desired. The reasons for poorer product quality reside in the difficulties in applying a uniform coating of abrasive grains, in firmly embedding the individual grains in the adhesive "make" coatings, and in aligning any substantial proportion of the grains. When abrasive grains are poured, sprinkled or showered by mechanical means on the moving adhesive coating, the grains tend to agglomerate, stratify and arrange themselves in streaks or ridges on the adhesive coating. Usually, it is only their own weight in free fall which is operative to embed a portion of the particles in the adhesive with the result that the grains are more easily removed during use. Once adhered to the sheet, the grains are held with their major axes randomly disposed, and as a result, the cutting efficiency of such products has been unduly low.

It is a principal object of this invention, therefore, to provide a method and apparatus for the production of coated products wherein already-deposited particles are more firmly retained by the adhesive layer by reason of their being more deeply embedded therein.

Another object of this invention is to improve the uniformity of an already-deposited coating of finely-divided material.

Still another object of this invention is to provide a method and apparatus wherein a substantial proportion of already-deposited finely-divided material can be aligned with their major axes normal or substantially erect on the sheet material.

Still another object of this invention is the elimination and dispersion of clusters formed upon the coated sheet.

It is also an object of this invention to provide a method and apparatus for accomplishing the foregoing objects and, in addition, for removing any excess or loosely-adhered material from the coating without disturbing embedded or adhered material, or without damage to the adhesive layer itself or to the sheet material.

Still other objects and advantages of the present invention will be apparent, or will become apparent in the following detailed description of the invention when taken in conjunction with the accompanying drawings, in which:

Fig. 1 is a schematic perspective view partly in section of apparatus of this invention, showing in particular the disposition of several sets of electrodes with relation to an abrasive-coated sheet;

Fig. 2 is a cross sectional view of one of the field electrodes shown in Fig. 1, the section being taken along the line 2—2 of Fig. 1; and Fig. 3 is a diagram of a suitable current source for the apparatus of Fig. 1.

In accordance with the present invention, it has been discovered that an adhesive-coated sheet having a freshly-deposited coating of finely-divided particulate material, for example, abrasive grains deposited by a gravimetric method, can be subjected to a changing electrostatic field wherein the particles are charged and recharged so as to be mutually repulsive one to the other, thereby causing loose or imperfectly adhered or embedded material to fly about in random fashion and to fill in imperfectly coated areas; to cause already embedded material to be more firmly embedded; and to a certain extent, align embedded particles due to their mutual repulsion. It has been found that for these purposes, a changing field is required, that is, an electrostatic field set up by a high alternating voltage or by a unidirectional voltage of widely pulsating or changing magnitude. It is preferred that the changing field be implemented with a corona discharge provided by a plurality of wires or sharp discharge points. It is believed that in such a field the embedded particles are "wiggled" or "beaten in" so as to be more firmly embedded. It is also believed that the changing field more efficiently redistributes imperfectly adhered grains to fill in thinly coated areas and then wiggles them firmly in the adhesive. Likewise, it is believed that the changing field tends somewhat to align closely packed side-by-side particles due to their mutual repulsion and mechanical interference one with the other. An unchanging or unidirectional field does not have this effect on an already-deposited abrasive layer.

Also in accordance with this invention, it has been discovered that if an already-deposited abrasive layer is first wiggled or beaten by a changing field, that a subsequent exposure, before the adhesive has dried or reset appreciably, to an intense unidirectional field will more efficiently align the embedded particles and make them stand more erect in the adhesive layer. The subsequent exposure of an already-deposited layer of particles to a unidirectional field after exposure to a changing field results in an abrasive sheet having a greater cutting efficiency and wear resistance than is possible to obtain with either type field alone. Not only is the proportion of grains aligned increased, but also the perpendicularity of each aligned grain is increased. Also, the unidirectional field tends to loosen or repel the imperfectly-adhered abrasive grains such that they more easily drop off the end of the machine.

Further, in accordance with this invention, it has been found that the efficiency of the electrostatic beater field and also of the alignment field are markedly increased if the sheet material and/or its grain layer are pre-conditioned before introduction to the electrostatic fields. Stray or unwanted charges, which are easily picked up, induced or generated in the sheet by passage of the sheet in close proximity to electrified parts of the apparatus and by rubbing or travelling over its own supporting roller system are substantial and interfere with the fields. The result of this variable electrical condition in the sheeting material is erratic operation of one or both fields, arcing-over, and the like. It has been found that if the sheeting material is first brought into electrical proximity to a charged or grounded electrode before introduction to the field, these charges can be neutralized, drained off, or a consistent charge imparted to the sheet and particles. Since the sheeting material, adhesive layer and abrasive grains are generally poorly-conducting materials, it is sometimes advantageous to provide, in addition to the sheet conditioning electrode, a corona discharge device adjacent and in close proximity to the grain layer in order to more effectively condition the grains themselves.

The method and apparatus of this invention will be better understood by referring to the drawings wherein electrode means for carrying out these functions are demonstrated in connection with the production of sandpaper, cloth-backed abrasives or similar sheet-type abrasives. As shown in Fig. 1, a contiguous sheet 10 of paper, cloth, etc. is brought under roll 11, then upwardly around roll 12, and horizontally between coating rollers 13 to be coated with a coating of liquid adhesive or resin. The lower roll 13 is partially submerged in the liquid adhesive contained in a trough or tank 14. From the rolls 13, the adhesive-coated sheet 15 is brought vertically to pass over conveyor roll 16 whereby its adhesive-coated surface is brought face up and conducted horizontally over left-hand conveyor roll 17 and then down under tensioning roller 18 and on to the next step in the process such as drying.

Near the right-hand end of the horizontal run of the sheet 15 an abrasive feed hopper 20, a rapidly-rotating feed roll 21 and shield or baffle 22 combine to shower a more or less uniform layer of abrasive grains on the adhesive coating. After receiving the coating of abrasive grains, the sheet 15 passes over a rod-like or roller-type electrode 23.

As shown in Fig. 1, a wire 24 is disposed above the sheet 15 in the vicinity of roller 23 to effect conditioning or removal of unwanted charges on the grains and upper surface of the sheet. The roller 23 is shown connected to lead 45 so as to be at the same polarity as the lower field electrode. The wire 24 is shown connected to a terminal 24a which may be of the opposite polarity to roller 23, to ground or to the same polarity as roller 23. It is preferred to connect wire 24 to the opposite pole or to ground.

The abrasive coated sheet 30 then is moved between a pair of field electrode assemblies 31, 32. The lower electrode assembly 31 comprises a massive support element 33 of insulating material, an electrode 34 and a cover or envelope 35 of semi-conducting material. The electrode support 33 is supported on a machine frame member 36 (Fig. 2) and serves to insulate the electrode 34 from the frame and other parts of the apparatus. The electrode 34 is shown as hollow but it also could have a core of insulating material such as wood, plastic, etc. The cover or envelope 35, as pointed out above, is made of a suitable semi-conducting material such as plastic containing a conducting or semi-conducting carbon black or other filler.

The upper electrode assembly 32 has a frame or support of insulating material including angle-shaped side members 40, a top piece 41, a core of wood 42 or other poor conductor or insulator, and a plurality of wires, straps or strips 43 wound around core 42. As shown more clearly in Fig. 2, the core 42 and its windings 43 are supported in spaced-apart relation on envelope 35 by means of a strip-like spacer 44 on either side. The windings 43 are corona discharge elements, preferably but not necessarily, have a triangular shape. The efficiency of the corona discharge element is increased when a sharp point is provided.

Lower electrode 34 is connected by lead 45 to ground or to one pole of a source of alternating or pulsating high voltage while upper electrode windings 43 are connected to the opposite pole. Connection of lower electrode 34 to ground is preferred when corona windings 43 are connected to the H. V. pole 81 of the transformer of the circuit shown in Fig. 3 because the web is conductive and is connected to ground by virtue of its supporting roller system.

The lower electrode assembly 31 is provided with a safety neon glow tube 50 which has an exciter element 51 housed in insulating support 33 and a ground wire 52. The field from electrode 34, 43 excites the tube 50 and indicates to the operator that the current is turned on.

In the electric field established between electrodes 34 and 43 the abrasive particles adhering to sheet 30 are alternately attracted and repelled toward electrode 34 if the voltage in windings 43 is alternating, or periodically repelled towards electrode 34 if the voltage in windings 43 is of the unidirectional pulsating variety. In either case, the particles are driven deeper into the adhesive layer. At the same time, the particles are given a like charge which makes them mutually repulsive. Those which are firmly embedded, while they cannot leave the adhesive layer, can move slightly for alignment purposes. Those which are loose or imperfectly attached are periodically repelled back and forth, their mutual repulsiveness tending to spread them over the entire sheet 30 where some are driven into bare or imperfectly covered adhesive areas while the beating action firmly anchors them into the adhesive and secures them against further movement. In this way, the individual grains are more firmly embedded and more uniformly distributed. Since the spaces between embedded grains tend to be filled by loose grains, and the grains themselves are mutually repulsive, there is a strong tendency for the embedded grains to assume a vertical position due to the wedging action of the grains entering the layer under the urging of the field.

The adhesive layer on sheet 30 is most frequently characterized as a gel since it is composed of imperfectly set or cured resin, and the like. Heretofore, it has been proposed to effect redistribution, alignment and loosening of excess grains by means of mechanical beaters operating on the opposite side of the sheet. These devices stretch the sheet, introduce sheet tensioning problems, vibration dampening problems, and most importantly, tend to weaken, degrade or destroy the gel-like character of the adhesive. As a result, the particles are held less firmly. The electrodes 34, 43 may be termed an electrostatic beater which operates without disturbing the adhesive gel layer. Unlike mechanical beaters, the electrostatic beater fulfills one function, which mechanical beaters are incapable of, that of driving embedded grains deeper into the adhesive and aligning them. Its use, therefore, results in a greatly superior product.

From the electrostatic beater electrodes 34, 43 the abrasive-coated sheet passes over a suitably electrically connected buffer electrode 60 and thence between a second pair of electrode assemblies 61, 62. In Fig. 1, the buffer electrode 60 removes unwanted charges from the sheet 30 and increases the intensity of the alignment field. This electrode ordinarily is not required under favorable operation conditions. Electrodes 61, 62 are similar in design and construction to the bottom beater electrode assembly 31 in that the corona-type electrode windings of upper electrode 32 are replaced by a plain flat or hollow electrode 63. For the latter reason, the parts, except those noted, are given the same identifying numerals as the corresponding elements of assembly 31. Upper electrode 63 is connected by means of lead 64 to ground or to a source of unidirectional high voltage. Lower electrode assembly 61 is connected by means of lead 65 to ground (if electrode 62 is connected to high voltage) or to a source of high voltage of opposite polarity to that of upper electrode 62. As a result, a unidirectional electrostatic field of great intensity is established between electrode assemblies 61, 62. The embedded, redistributed and partially aligned abrasive grains on the web or sheet 30 immediately assume a more erect position. Loose or excess grains tend to be loosened due to the attractive force of the upper electrode 62 so as to fall into hopper 66 placed at the end of the horizontal run. Because of the work exerted on the embedded grains by the electrostatic beater electrodes, the field existent between alignment electrodes 61, 62 can more efficiently perform its principal alignment function. As a result, a more efficient and longer-wearing abrasive sheet is obtained.

An exemplary circuit for supplying an alternating high voltage is shown in Fig. 3. The current is provided by means of a pair of power input leads 70 across which is connected a safety control box consisting of a pilot light 71 and a safety switch 72. A single pole single throw switch 73 is utilized to energize and de-energize the circuit. Two leads 74 connect with a test plug 75, a voltage regulator 76, a voltmeter 77, a fuse 78, a pair of pilot lights 79 and finally a high-voltage transformer 80. One pole of the high voltage side of transformer 80 is grounded and the second pole 81 is the high voltage terminal which is connected to corona windings 43. The supply to leads 70 may be ordinary 115 volt 60 cycle current. By varying the setting of regulator 76, control of the output voltage may easily be effected. Voltages of from 5 to 40 kilovolts or more may be utilized. With the above arrangement, the transformer 80 delivers 60 cycle high voltage. For most purposes, this frequency is satisfactory. With the finer abrasive sizes, a higher frequency is sometimes advantageous and with the larger abrasive grain sizes a lower frequency sometimes is more efficient.

What is claimed is:

1. Apparatus for the production of sheet material coated with adhesively-bound particulate matter comprising means for supporting and transporting said sheet material having a coating of particulate matter adhering to an as-yet uncured adhesive, a pair of electrodes disposed in the path of travel of said sheet material with one said electrode located thereabove and the other therebelow, the upper of said electrodes having a number of corona discharge points opposed to and in close proximity to said particulate matter on said sheet material, means for impressing a high voltage alternating electrical charge across said electrodes, a second pair of electrodes disposed subsequent to said first-named electrodes with respect to the path of travel of said sheet material, and means for impressing unidirectional high voltage to said second set of electrodes, the changing high voltage supplied to said first set of electrodes having a sufficient magnitude to redistribute and embed loosely adhering particulate matter on said sheet and said unidirectional voltage supplied to said second-named electrodes being sufficient to align embedded particulate matter and loosen imperfectly adhering particulate matter on said sheet.

2. Apparatus for the production of sheet material having a coating of adhesively-bound abrasive grains which comprises means for supporting and transporting sheet material having said abrasive coating adhering to an as-yet uncured adhesive, upper and lower electrodes disposed in the path of travel of said sheet, said upper electrode comprising a plurality of triangular shaped corona discharge wires with their points opposed to and in close proximity to said adhered abrasive grains, a second set of electrodes located about said sheet material subsequent to said first electrodes in the path of travel thereof with said sheet material passing therebetween, means for supplying an alternating current to the first said electrodes at a voltage sufficient to redistribute and embed loosely-adhered abrasive grains and means for applying unidirectional high voltage to said second set of electrodes sufficient to align embedded abrasive grains and loosen imperfectly adhered abrasive grains.

3. Apparatus as defined in claim 2 and further characterized in that a buffer electrode is disposed, in contact with a non-coated side of said sheet material, and ahead of said first electrodes, and means for connecting said buffer electrode to the same potential as the lower electrode of the said first electrodes.

4. Apparatus as claimed in claim 2 and further characterized in that a grounded buffer electrode is disposed in contact with said sheet between said first and said second sets of electrodes.

References Cited in the file of this patent

UNITED STATES PATENTS

| | | |
|---|---|---|
| 1,854,071 | Schacht | Apr. 12, 1932 |
| 2,097,233 | Meston | Oct. 26, 1937 |
| 2,221,338 | Wintermute | Nov. 12, 1940 |
| 2,328,904 | Hiers | Sept. 7, 1943 |
| 2,385,873 | Melton | Oct. 2, 1945 |
| 2,447,374 | Smyser | Aug. 17, 1949 |
| 2,608,176 | Jenkins et al. | Aug. 26, 1952 |
| 2,681,036 | Ewing et al. | June 15, 1954 |
| 2,686,141 | Sawyer | Aug. 10, 1954 |